US012420276B2

(12) United States Patent
Edwards (10) Patent No.: US 12,420,276 B2
(45) Date of Patent: Sep. 23, 2025

(54) PROBE APPARATUS, ASSEMBLIES, AND METHODS FOR ASPIRATING AND DISPENSING LIQUIDS

(71) Applicant: Siemens Healthcare Diagnostics Inc., Tarrytown, NY (US)

(72) Inventor: Mark Edwards, Armonk, NY (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 427 days.

(21) Appl. No.: 16/954,289

(22) PCT Filed: Dec. 5, 2018

(86) PCT No.: PCT/US2018/064125
§ 371 (c)(1),
(2) Date: Jun. 16, 2020

(87) PCT Pub. No.: WO2019/125770
PCT Pub. Date: Jun. 27, 2019

(65) Prior Publication Data
US 2021/0077991 A1 Mar. 18, 2021

Related U.S. Application Data

(60) Provisional application No. 62/607,788, filed on Dec. 19, 2017.

(51) Int. Cl.
*B01L 3/02* (2006.01)
*G01N 35/10* (2006.01)
*G01N 35/00* (2006.01)

(52) U.S. Cl.
CPC .......... *B01L 3/021* (2013.01); *G01N 35/1004* (2013.01); *B01L 2200/026* (2013.01);
(Continued)

(58) Field of Classification Search
CPC ...................... B01L 2200/026; B01L 2400/06
See application file for complete search history.

(56) References Cited

U.S. PATENT DOCUMENTS 4,228,831 A * 10/1980 Kerns ................ G01N 35/1009
422/561
5,229,074 A 7/1993 Heath et al.
(Continued)

FOREIGN PATENT DOCUMENTS

CN 105934405 A 9/2016
CN 106092846 A 11/2016
(Continued)

OTHER PUBLICATIONS

Extended EP Search Report dated Feb. 5, 2021 of corresponding European Application No. 18892703.2, 5 Pages.
(Continued)

*Primary Examiner* — Natalia Levkovich (57) ABSTRACT

A probe assembly for aspirating and delivering liquids includes a liquid line having a liquid line end and a pipette configured to be in fluid communication with the liquid line, the pipette configured to aspirate and dispense liquids when the probe assembly is devoid of connections to external liquid sources other than liquids being aspirated or dispensed, the liquid line end having a first portion of a dynamic coupler configured to be dynamically coupled to a second portion of a dynamic coupler, and the second portion of the dynamic coupler configured to be in fluid communication with a liquid source external to the probe assembly. Other probe assemblies, testing apparatus, and methods are disclosed.

22 Claims, 6 Drawing Sheets

(52) U.S. Cl.
 CPC ....... *B01L 2400/04* (2013.01); *B01L 2400/06* (2013.01); *G01N 2035/00425* (2013.01)

(56) References Cited

U.S. PATENT DOCUMENTS

| | | |
|---|---|---|
| 5,493,923 A | 2/1996 | Balfanz et al. |
| 5,571,946 A | 11/1996 | Koshi et al. |
| 6,143,252 A * | 11/2000 | Haxo, Jr. ............. B01J 19/0046 |
| | | 506/40 |
| 6,322,752 B1 | 11/2001 | Siddiqui et al. |
| 6,439,027 B1 | 8/2002 | Hiss, III |
| 2005/0074363 A1 | 4/2005 | Dunfee |
| 2012/0024888 A1 | 2/2012 | Shvets et al. |
| 2013/0112761 A1 | 5/2013 | Dunfee et al. |
| 2013/0195718 A1 | 8/2013 | Michels et al. |
| 2015/0276534 A1 | 10/2015 | Dunfee et al. |
| 2015/0323220 A1 | 11/2015 | Dumitrescu et al. |
| 2016/0023203 A1 | 1/2016 | Richardson |

FOREIGN PATENT DOCUMENTS

| | | |
|---|---|---|
| EP | 1210575 B1 | 2/2010 |
| EP | 2879581 B1 | 12/2017 |
| JP | S62-168056 A | 7/1987 |
| JP | H10-114394 A | 5/1998 |
| JP | 2004-347513 A | 12/2004 |
| JP | 2008-203009 A | 9/2008 |
| WO | 2012/009213 A1 | 1/2012 |

OTHER PUBLICATIONS

PCT International Search Report and Written Opinion dated Feb. 14, 2019 (9 Pages).

* cited by examiner

PROBE APPARATUS, ASSEMBLIES, AND METHODS FOR ASPIRATING AND DISPENSING LIQUIDS

CROSS-REFERENCE TO RELATED APPLICATIONS

This application claims priority to U.S. Provisional Application Ser. No. 62/607,788 filed on Dec. 19, 2017, the contents of which is incorporated herein by reference in its entirety.

FIELD

The present disclosure relates to methods, assemblies, and apparatus adapted to aspirate and dispense liquids.

BACKGROUND

In automated analytical testing, purified water may be dispensed for various purposes. In certain clinical analyzer instruments used to test for the presence of an analyte in a biological fluid sample (otherwise referred to as "specimen"), it may be desirable to precisely meter the purified water to be used in the testing. For example, in some automated analytical testing systems (e.g., clinical analyzer or immunoassay instruments), specimens contained in sample containers (such as test tubes, sample cups, vials, and the like) may be aspirated and tested to determine a presence of a particular analyte or substance therein, or a characteristic thereof. As part of this analytical testing process, precise metering of the process liquid (e.g., purified water) and/or control of a temperature of the process liquid may be desired in order to provide for improved testing accuracy.

Pipettes used for aspiration and dispensing of the liquids may become contaminated after use and need to undergo washing so they can be used again. The pipettes are transferred to a wash station where they are cleaned with liquids.

Providing liquid at a predetermined temperature to a pipette may be difficult due to many variables that affect liquid temperature within a test station. For example, a flexible tube carrying the liquid may be very long (e.g., 6 feet+ long (1.8 m+ long)) and may be routed throughout the test station in order to follow a pipette used to facilitate aspiration and/or dispense of the liquid. This exposed length may make liquid in the tube susceptible to environmental thermal effects, such as exposure of the tube to different temperatures generated by different components in a test station. As such, the temperatures of liquid in the tube may vary and may be difficult to maintain at a desired temperature. In addition, the liquid in the tube may either flow or be stationary for periods of time, which further complicates thermal uniformity of the liquid in the tube.

SUMMARY

According to a first aspect, a probe assembly configured to aspirate and deliver liquids is provided. The probe assembly includes a liquid line having a liquid line end; and a pipette configured to be in fluid communication with the liquid line, the pipette configured to aspirate and dispense liquids when the probe assembly is devoid of connections to external liquid sources other than liquids being aspirated or dispensed; the liquid line end having a first portion of a dynamic coupler configured to be dynamically coupled to a second portion of a dynamic coupler, the second portion of the dynamic coupler configured to be in fluid communication with a liquid source external to the probe assembly.

According to another aspect, a station for providing process liquid to a probe assembly is provided. The station includes a basin; a first portion of a dynamic coupler coupled to the basin and configured to fluidly couple to a second portion of a dynamic coupler of the probe assembly; and a liquid delivery line in fluid communication with the first portion of the dynamic coupler and configured to receive process liquid from a liquid source.

According to another aspect, a testing apparatus is provided. The testing apparatus includes a probe assembly including: a tube having a tube end, the tube end having a first portion of a dynamic coupler, the first portion of the dynamic coupler configured to couple to a second portion of the dynamic coupler, and a pipette configured to be in fluid communication with the tube. The testing apparatus further including a liquid source and a liquid delivery line having a first end in fluid communication with the liquid source and a second end in fluid communication with the second portion of the dynamic coupler.

In a method aspect, a method of washing a pipette coupled to a probe assembly is provided. The method includes providing a first portion of a dynamic coupler on a tube, the tube in fluid communication with the pipette; providing a second portion of the dynamic coupler in fluid communication with a liquid source; moving the probe assembly to a position where the first portion of the dynamic coupler couples with the second portion of the dynamic coupler; and providing liquid from the liquid source through the dynamic coupler and to the pipette.

Still other aspects, features, and advantages of the present disclosure may be readily apparent from the following description by illustrating a number of example embodiments and implementations. The present disclosure may also be capable of other and different embodiments, and its several details may be modified in various respects, all without departing from the scope of the present disclosure. Accordingly, the drawings and descriptions are to be regarded as illustrative in nature, and not as restrictive. The disclosure is to cover all modifications, equivalents, and alternatives falling within the scope of the disclosure.

BRIEF DESCRIPTION OF THE DRAWINGS

The drawings, described below, are for illustrative purposes only and are not necessarily drawn to scale. The drawings are not intended to limit the scope of the disclosure in any way.

DETAILED DESCRIPTION

Apparatus and methods for providing process liquids to probe assemblies in test stations are described herein. The apparatus and methods described herein improve control of temperatures of liquids distributed throughout automated testing apparatus. In one or more analytical tests, temperature drift may be attributed to changes in a temperature of a process liquid that is contained within a liquid delivery tube extending between a metering apparatus (e.g., including a pump) and an outflow (e.g., a pipette). In some embodiments, this results in temperature drift in one or more of the liquid components (e.g., specimen or reagent) involved in the test (e.g., assay) and may possibly affect testing results. In other embodiments, variations in a temperature over time of the process liquid (e.g., purified and de-ionized water) that is contained in the liquid delivery tube may affect a volume of the process liquid dispensed.

Even in cases where the process liquid may not be dispensed, a liquid component dispensed (e.g., a specimen such as serum, urine, spinal fluid, cerebral fluid, interstitial fluid, or the like, or a reagent) may be fluidly coupled to a secondary liquid as a backing liquid in the tube, and any expansion or contraction of the process liquid in the liquid delivery tube may likewise affect the level of precision achievable when metering a volume of the secondary liquid. Also, changes in temperature of the backing liquid may affect the dispensed temperature of any secondary liquid aspirated (e.g., reagent, specimen, or the like).

A pipette may, in some embodiments, be washed at a washing station before and/or after specimen or reagent is aspirated or dispensed. A large volume (e.g., 21 mL) of process liquid may be flushed through the liquid delivery tube and interior of the pipette while the pipette is inserted into a wash station. During the pipette wash operation, the temperature of the pipette and the liquid delivery tube may be influenced by the temperature of the process liquid. Accordingly, by better controlling the temperature of the process liquid that is being dispensed during washing, improved and more efficient washing may be achieved, reducing fluid-to-fluid interactions between subsequent pipette uses.

Temperature variations due to many sources may be experienced in a liquid delivery tube between a liquid delivery assembly and the probe assembly. The temperature variations may change temperatures of liquids provided to the pipette. For example, in some instances, steady use may contribute to temperature variations (e.g., system temperature increases over time), which may arise from heat being transferred by convection, conduction, and/or radiation from other system components, such as a vacuum pump, system heater, motor(s), or other heat-generating components of the testing apparatus. Additional temperature variations may come from intermittent filling of a tank that provides the process liquid with relatively cold liquid. In some embodiments, a process liquid (e.g., de-ionized and purified water) that is cooler than a liquid in the tank may be manually added to the tank. In any event, adding process liquid or otherwise refilling the tank may cause rather large disturbances in the temperature of the process liquid.

Traditional test apparatus include test probes that are fluidly coupled to liquid delivery tubes as the probes move throughout the testing apparatus. Thus, the liquid delivery tubes move and are subjected to the above-described temperature variations. The testing apparatus and methods described herein overcome many of the adverse effects of temperature variations by providing sources of process liquids and localized heating of process liquids without the use of liquid delivery tubes continually coupled to the probe assemblies.

In view of the foregoing problems, embodiments of the present disclosure provide methods, assemblies, and apparatus that are configured to provide improved control of a temperature of liquids provided to an outflow (e.g., a pipette of a probe assembly). According to one or more embodiments of the disclosure, dynamic couplers may be provided proximate stations, such as wash stations, throughout the testing apparatus. The dynamic couplers may be in fluid communication with a tank or other source of the process liquid or other liquids. A probe assembly to which a pipette may be attached may have a portion of a dynamic coupler attached thereto. The probe assembly is moved proximate the dynamic coupler such that the dynamic coupler and the portion of the dynamic coupler of the probe assembly fluidly connect. The process liquid or other liquid is then provided to the probe assembly and the pipette without tubing or other liquid lines being routed throughout the testing apparatus. In some embodiments, localized heating of the liquid is provided proximate to the dynamic couplers to precisely control the temperature of liquid provided to the probe assembly. These and other aspects and features of embodiments of the disclosure will be described with reference to FIGS. 1-5 herein.

Figure 1:
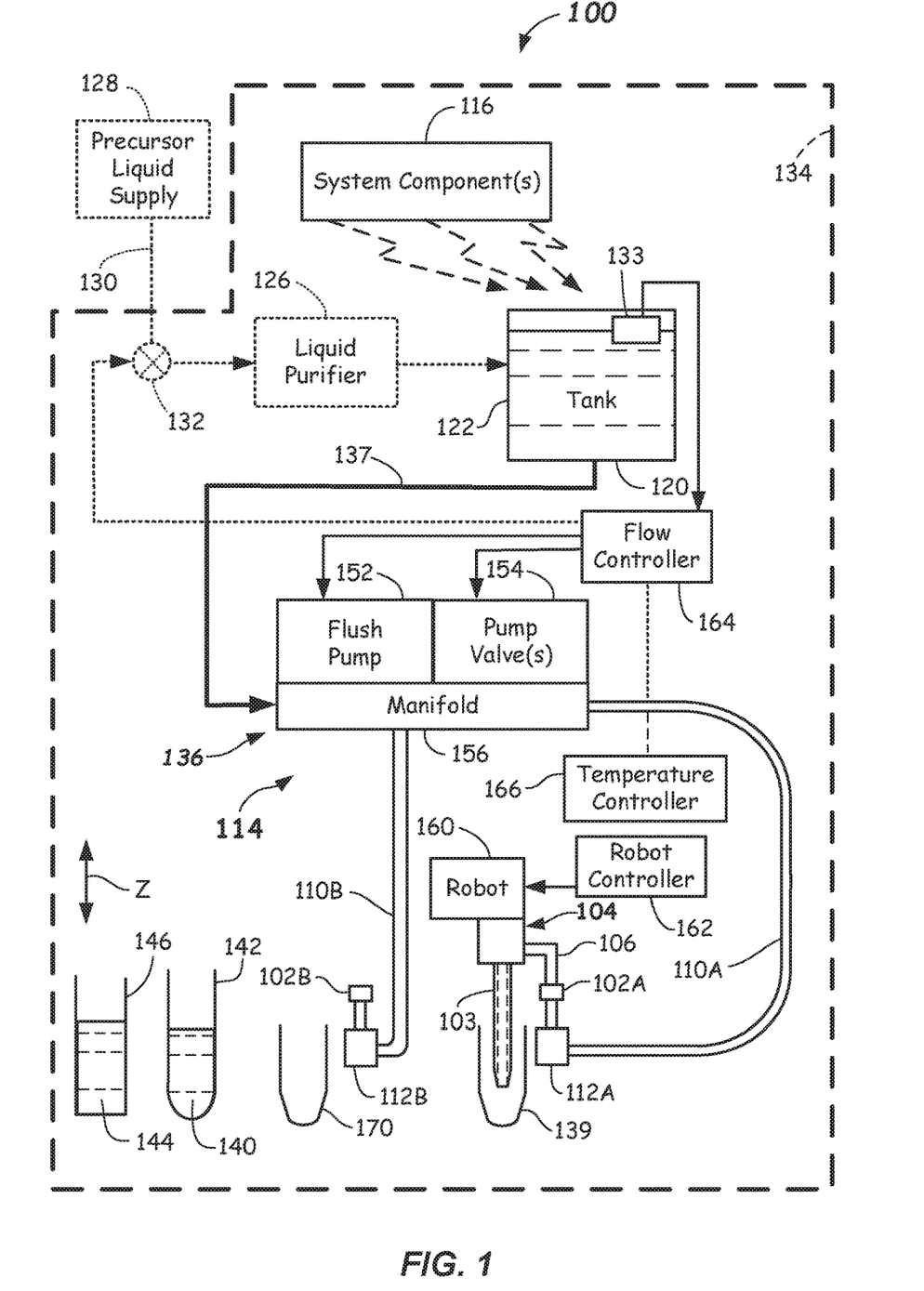
FIG. 1 illustrates a block diagram of a testing apparatus including a dynamic coupler between a probe and a liquid source according to embodiments.

Reference is now made to FIG. 1, which shows a block diagram of a testing apparatus 100 including a first dynamic coupler 102A and a second dynamic coupler 102B. Portions of the first dynamic coupler 102A and/or the second dynamic coupler 102B may be fixed within the testing apparatus 100 so as to be immobile. As described in greater detail herein, a dynamic coupler includes a two-piece coupler including a first portion and a second portion that, when connected or coupled together, provide fluid communication between the first portion and the second portion. Coupling the first portion and the second portion may be achieved by pushing the first portion and the second portion together. In some embodiments coupling and decoupling the first portion and the second portion does not require twisting or screwing one portion relative to the other portion. For example a linear translation between the first portion and the second portion causes coupling when pushed together and decoupling when pulled apart. A portion of the dynamic coupler 102A may be fluidly coupled to the probe assembly 104 by way of a liquid line 106.

The dynamic coupler 102A may be identical to the dynamic coupler 102B. The testing apparatus 100 may have any number of dynamic couplers located throughout, such as at fixed locations within the testing apparatus 100. The dynamic coupler 102A enables liquid to be delivered to a probe assembly 104 at different locations within the testing apparatus 100. For example, the use of the probe assembly 104 in conjunction with the dynamic coupler 102A eliminates a fluid delivery line permanently and/or continually attached to the probe assembly 104. The dynamic coupler 102A enables the probe assembly 104 to be connected to a liquid delivery line 110A when the probe assembly 104 is proximate a station requiring liquid, such as a wash station 139. An inline heater 112A may heat liquids provided to the probe assembly 104. The heater 112A may be proximate the dynamic coupler 102A so liquid heated by the heater 112A does not undergo large temperature changes prior to being received in the probe assembly 104.

The dynamic coupler 102A enables the probe assembly 104 to be disconnected from the liquid delivery line 110A when the probe assembly 104 is moving within the testing apparatus 100. Liquids provided to the probe assembly 104 may be stored within the probe assembly 104 after the probe assembly 104 is decoupled from the liquid delivery line 110A. For example, liquids may be stored in an accumulator (not shown in FIG. 1) that is in fluid communication with the probe assembly 104. Therefore, the liquid delivery line 110A does not follow the probe assembly 104 throughout the testing apparatus 100. The dynamic coupler 102B may be connectable to a second probe assembly (not shown) and a liquid delivery line 110B. A heater 112B may be in line with the liquid delivery line 110B and may be located proximate the dynamic coupler 102B. Other conventional components of the testing apparatus 100, such as incubation plates or rings, other pipettes, robots, sample racks, reagent racks, wash stations, readers, and the like not shown for clarity.

The testing apparatus 100 may include a tank 120 filled with process liquid 122 from a liquid purifier 126, for example, which may receive process liquid precursor (e.g., unpurified water) from a precursor liquid supply 128 through inflow conduit 130 and valve 132 (all shown in dotted lines as being optional). The precursor liquid supply 128 may be a city water or private water supply, a water tank, a well, or the like. Liquid purifier 126 may be any suitable device, or collection of devices, that receives incoming precursor liquid from the precursor liquid supply 128 supplied from inflow conduit 130, and filters and/or otherwise purifies the precursor liquid to produce and supply process liquid 122 (e.g., suitably purified water that is purified to a relatively-high level) to the tank 120. The tank 120 may be filled with other liquids.

In more detail, a flow of a process liquid 122 (e.g., purified and deionized water) of a liquid delivery assembly 114 may be provided and delivered from the tank 120. As process liquid 122 in the tank 120 is used by the testing apparatus 100, process liquid 122 may be replenished. Replenishment may be dictated by a level sensor 133 (e.g., a float type or other depth sensor) situated at an appropriate level within the tank 120. Other types of level sensors may be used.

The liquid purifier 126 may remove organics, chemical elements, minerals, particles or sediment, dissolved oxygen, or other contaminants from the precursor liquid. The process liquid 122 may then be used in the testing apparatus 100 (e.g., instrument or analyzer) to dilute specimen, to prepare reagents (e.g., where the process liquid 122 is added to reagent material), as a backing liquid in the liquid delivery line 110A to enable dispensing and/or aspirating of liquid reagents (e.g., concentrated reagents), as a backing liquid to aspirate or dispense specimens (e.g., serum, urine, spinal fluid, interstitial fluid, cerebral fluid, or the like), to wash cuvettes, and/or to clean pipettes, for example. The liquid purifier 126 may also include various conduits, valves, accumulators, sensors, and other fluid-containing or fluid-conveying components (not shown).

The purification level of the process liquid 122 may be to ASTM/NCCLS standards (e.g., NCCLS—National Committee on Clinical Laboratory Standards). For example, the purity may be sufficient to meet the standards for ASTM/NCCLS Type 1-IV and/or Type A-C. ASTM/NCCLS Type 1 and Type A purity standards may be provided. However, other purity levels may be used.

Process liquid 122 may be provided by the liquid purifier 126 by using any suitable purification method, such as reverse osmosis, micro-filtration, nano-filtration, ultra-filtration, and/or deionizing. Other purification methods may be alternately used or in combination therewith. As shown, the liquid purifier 126 may be part of the testing apparatus 100. However, it may be in a separate device, or even in a separate room in some embodiments.

The above-described variations in temperature may be especially prevalent at times of high usage of the liquid delivery assembly 114. Other contributors to variations in temperature may be due to changes in temperature of the precursor liquid supply 128 (e.g., daily or seasonal changes in water supply temperature), starting and stopping the liquid delivery assembly 114, and changes in ambient temperature to which the liquid delivery assembly 114 is exposed.

As should now be understood, variations in temperature of the precursor liquid from the precursor liquid supply 128 provided to the liquid purifier 126 may produce temperature variations at the tank 120 and in the liquid delivery line 110A over time. Such temperature variations over time may result in contraction and/or expansion of the process liquid 122 (e.g., purified water) contained in the liquid delivery line 110A. This relative change in liquid volume in the liquid delivery line 110A may, in some instances without very frequent, time-robbing recalibrations, possibly affect metering accuracy over time.

Heat (depicted by jagged and dotted arrows) from one or more system components 116 of the testing apparatus 100, such as a refrigerator unit, vacuum pump, system heater, and/or other components, may be generated within a housing 134 of the testing apparatus 100 (the housing 134 shown dotted). Accordingly, the interior of the housing 134 may be subject to temperature fluctuations during use. Changes in ambient temperature to which the testing apparatus 100 is exposed may further aggravate the temperature variations. Similarly, as discussed above, the temperature of the process liquid 122 in the tank 120 may vary significantly over time.

In some embodiments, the liquid delivery assembly 114 may be coupled to, or be part of, a precision metering system of the testing apparatus 100, and may deliver a precisely-metered and temperature-controlled volume of one or more liquids to the pipette 103. For example, during washing stages, the probe assembly 104 may be coupled to the liquid delivery line 110A by way of the dynamic coupler 102A. The liquid delivery assembly 114 may then provide process liquid 122 to the pipette 103 to wash the pipette 103.

The liquid delivery assembly 114 may include a delivery apparatus 136 fluidly coupled to the tank 120, such as by conduit 137. Delivery apparatus 136 may be configured and adapted to dispense a precise amount of the process liquid 122 from the pipette 103 when the probe assembly 104 is coupled to the liquid delivery line 110A by way of the dynamic coupler 102A. The process liquid 122 may be for washing the pipette 103 such as before or after aspirating or dispensing a liquid component, such as a specimen 140 from a specimen container 142, reagent 144 from a reagent vessel 146, or an acid, a base, or other liquid(s) (not shown) that may be used in the testing apparatus 100. The process liquid 122 may be used as the vehicle (backing liquid) for carrying out the aspiration and dispense. In some embodiments, the process liquid 122 may be used as a diluting agent in an assay process or other testing process undertaken by the testing apparatus 100. The assay process or other testing process may be used to determine an amount of an analyte or component in, or characteristic of, the specimen 140 (e.g., a biological liquid specimen), for example.

The delivery apparatus 136 may include any combination of devices adapted to cause flow of the process liquid 122 in the liquid delivery line 110A. For example, the delivery apparatus 136 may include a flush pump 152 that may be configured and adapted to precisely dispense relatively larger volumes of the process liquid 122, such as to carry out a washing operation in order to flush out the one or more of the components (e.g., pipette 103). In some embodiments, by activating one or more valve(s) 154 and the flush pump 152, precise volumes of process liquid 122 of between about 200 µl up to about 5 ml can be delivered for flushing. However, other volumes may be delivered.

One or more valve(s) 154 may be used to switch the liquid delivery line that is coupled to the flush pump 152, and a manifold 156 may be provided at suitable locations for accomplishing flow distribution of the process liquid 122. For example, the valve(s) may couple the liquid delivery line 110A and/or the liquid delivery line 110B to the flush pump 152. The manifold 156 may be a distribution manifold containing multiple internal passages connecting to the flush pump 152, the one or more valve(s) 154, the liquid delivery line 110A, and the liquid delivery line 110B. Other constructions of the delivery apparatus 136 may be used. For example, the delivery apparatus 136 may be replaced by a collection of conduits. Any suitable construction of the delivery apparatus 136 may be used.

A robot 160 may move the probe assembly 104 to different locations within the testing apparatus 100. For example, the robot 160 may move the probe assembly 104 between the wash station 139, the specimen container 142, and the reagent vessel 146. The robot 160 may move the probe assembly 104 in the z-direction to couple and decouple the probe assembly 104 to and from the dynamic coupler 102A. A robot controller 162 may generate instructions to control the movement of the robot 160.

A flow controller 164 may control the flow of the process liquid 122 or other liquids within the testing apparatus 100. For example, the flow controller 164 may prevent process liquid 122 from being distributed to a fluid delivery line unless a probe assembly is coupled to the corresponding dynamic coupler. The flow controller 164 may also transmit instructions to pumps (not shown in FIG. 1) located within the probe assembly 104 that perform aspiration and dispensing.

A temperature controller 166 may monitor liquid temperatures at different locations within the testing apparatus 100 and transmit instructions to heaters within the testing apparatus 100 in response to the monitoring. For example, the temperature controller 166 may transmit instructions to the heater 112A and the heater 112B instructing them to heat process liquid 122 during wash stages.

Figure 2A:
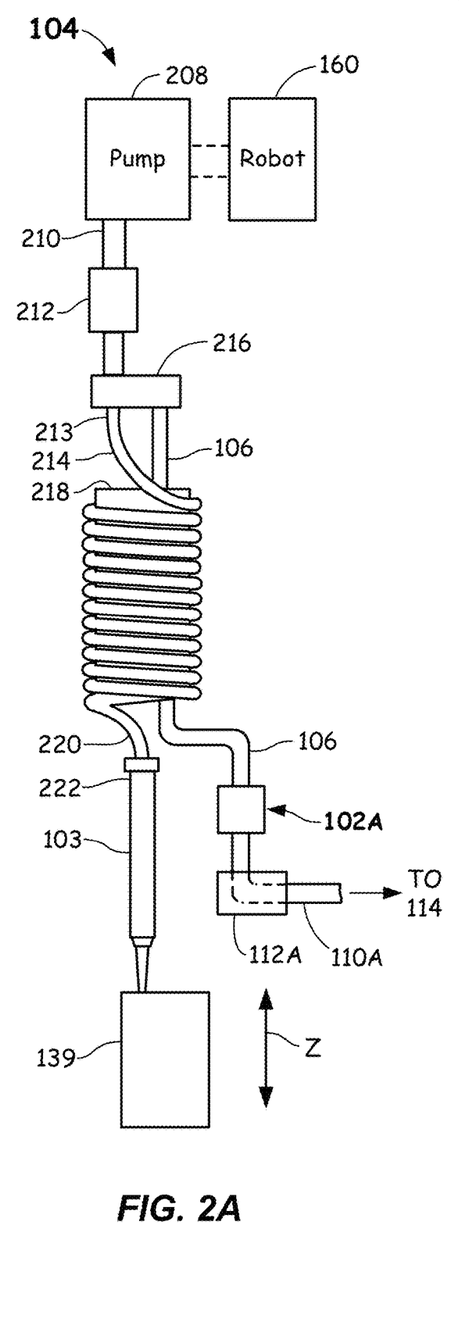
FIG. 2A illustrates a side elevation view of a probe dynamically coupled to a liquid source in a first setting of a valve assembly according to embodiments.
Figure 2B:
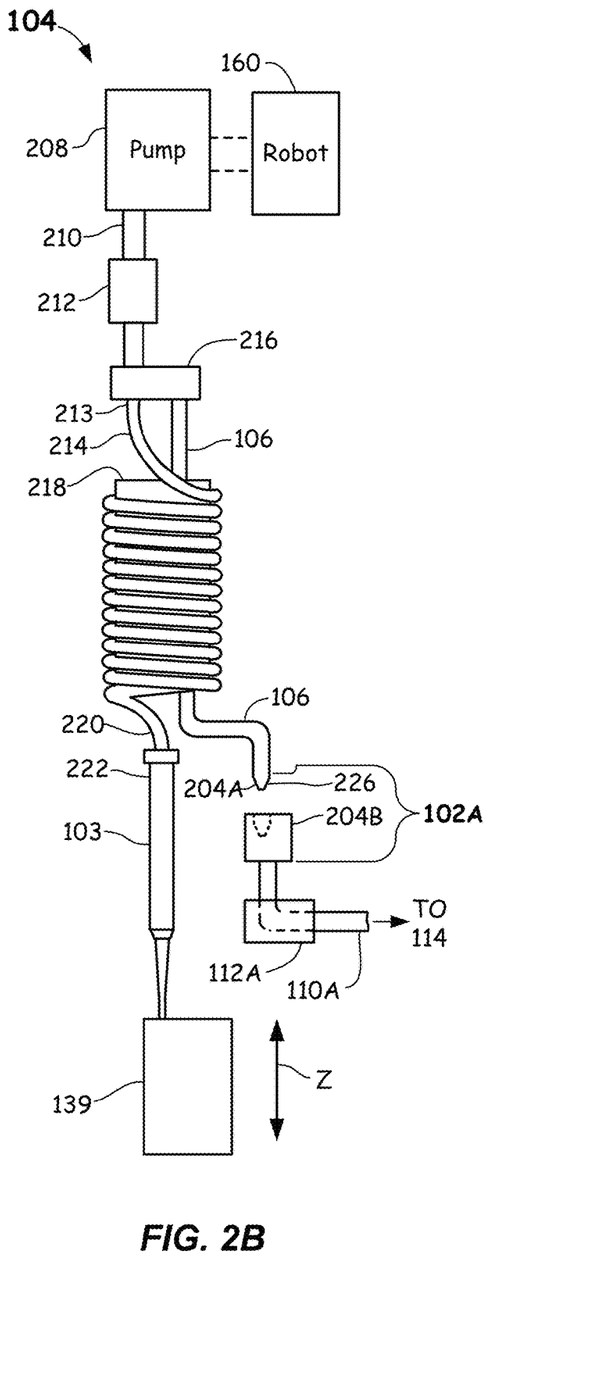
FIG. 2B illustrates the probe of FIG. 2A decoupled from the liquid source in a second setting of the valve assembly according to embodiments.

Reference is now made to FIG. 2A, which shows a side elevation view of an embodiment of the probe assembly 104 fluidly coupled to the liquid delivery assembly 114 by way of the dynamic coupler 102A. FIG. 2B shows the probe assembly 104 decoupled from the liquid delivery assembly 114. Specifically, the probe assembly 104 is shown decoupled at the dynamic coupler 102A from the liquid delivery line 110A. In the configuration shown in FIG. 2A, the robot 160 or other mechanism has lowered the probe assembly 104 in the z-direction to a position where the dynamic coupler 102A has fluidly coupled the liquid line 106 to the liquid delivery line 110A. Specifically, the dynamic coupler 102A provides fluid coupling between the liquid line 106 and the liquid delivery line 110A. In the configuration shown in FIG. 2B, the robot 160 has moved the probe assembly 104 in the z-direction to where the liquid line 106 is decoupled from the liquid delivery line 110A by way of the dynamic coupler 102A. The robot 160 may then move the probe assembly 104 to other locations within the testing apparatus 100 to perform other tasks. The robot 160 is shown physically coupled to the pump 208. The robot 160 may be coupled to other structures of the probe assembly 104, such as a chassis (not shown) or a housing (not shown).

The dynamic coupler 102A may include a first portion 204A and a second portion 204B that may couple together to fluidly couple devices connected to the first portion 204A with devices connected to the second portion 204B. In the embodiment depicted in FIG. 2B, the first portion 204A is shown as being a portion of the liquid line 106 (e.g., a first end 226) and the second portion 204B is shown as being a larger device that receives the first portion 204A (e.g., liquid line 106). In some embodiments, the first portion may refer to the larger device and the second portion may refer to a smaller device, such as an end of the liquid delivery line 110A. Accordingly, the references to first portion and second portion are interchangeable. As such, in some embodiments the larger portion or the second portion 204B may be connected to the liquid line 106 and the first portion 204A may be an end of the liquid delivery line 110A.

The probe assembly 104 may include a pump 208 including a port 210 coupled to a coupler 212. The coupler 212 may be any type of coupler that provides a liquid seal. In some embodiments, the coupler 212 may be a dynamic coupler. The coupler 212 enables removal and/or replacement of items in the probe assembly 104 below the coupler 212. The pump 208 may aspirate and dispense liquids into and out of the pipette 103 as described herein. In some embodiments, the pump 208 may be a syringe pump and may include an accumulator for storing liquid, such as the process liquid.

The coupler 212, first end 213 of a liquid line 214 (i.e., a second liquid line), and a second end 227 of the liquid line 106 (i.e., a first liquid line) may be fluidly coupled to a valve assembly 216. The valve assembly 216 may determine which device, the pump or the liquid line 106, is coupled to the liquid line 214 and ultimately to the pipette 103. For example, during a wash cycle, the valve assembly 216 may couple the liquid line 106 to the liquid line 214 and disconnect the pump 208 from the liquid line 214. In some embodiments, the valve assembly 216 may enable process liquid to pass to a reservoir or accumulator coupled to the pump 208 so as to dispense process liquid when the probe assembly 104 is at another location. During periods when the pipette 103 is aspirating or dispensing, the valve assembly 216 may couple the pump 208 to the liquid line 214 and disconnect the liquid line 106 from the liquid line 214.

In the embodiment depicted in FIGS. 2A and 2B, the liquid line 214 may contact a heater element 218 so as to heat fluids in the liquid line 214. For example, the heater element 218 may be cylindrical and the liquid line 214 may wrap or spiral around the heater element 218. In some embodiments, the heater element 218 is a passive device.

For example, the passive device may heat up during a wash phase when hot liquid flows past the heater element 218 and transfer the heat to a liquid in the liquid line 214 during reagent aspiration or other subsequent processes. In some embodiments, the heater element 218 is active and may be controlled by the temperature controller 166 (FIG. 1). A second end 220 of the liquid line 214 may be fluidly coupled to a first end 222 of the pipette 103.

The liquid line 214 may have a volume large enough to contain liquids (e.g., specimens) aspirated into the pipette 103. In the embodiment of FIGS. 2A and 2B, the volume of the liquid line 214 may be created by the length of the liquid line 214, such as the portion of the liquid line 214 wrapped around the heater element 218. The large volume of the liquid line 214 prevents aspirated liquids from contacting the valve assembly 216, which may be difficult to clean.

During the process of washing the pipette 103 and associated components, the process liquid 122 may be fluidly coupled to the probe assembly 104 by way of the dynamic coupler 102A. For example, the robot 160, by way of signals received from the robot controller 162 (FIG. 1), may move the probe assembly 104 to a position where the pipette 103 is located in the wash station 139. The valve(s) 154 may be configured so that the flush pump 152 is coupled between the tank 120 and the liquid delivery line 110A. The flush pump 152 may then be activated to force process liquid 122 into the liquid delivery line 110A. The process liquid 122 passes through the liquid delivery line 110A to the heater 112A where the process liquid 122 may be heated to a predetermined temperature.

The processing liquid 122 flows through the dynamic coupler 102A and into the liquid line 106. The valve assembly 216 may be set to couple the liquid line 106 to the liquid line 214. Thus, the processing liquid 122 passes through liquid line 214 and into the interior of the pipette 103 where it washes the pipette 103. In embodiments where the probe assembly 104 includes a heater element 218 that is passive, the processing liquid 122 heated by the heater 112 warms the heater element 218. In embodiments where the probe assembly 104 includes a heater element 218 that is active, the heater element 218 may provide additional heating to the processing liquid 122 in the liquid line 214 or other fluids in the liquid line 214. Temperature sensors (not shown) in the liquid line 106, the liquid line 214, the heater 112, and/or other locations in the path of the processing liquid 122 may measure the temperature of the processing liquid 122 and provide temperature information to the temperature controller 166. The temperature controller 166 may then transmit instructions to the heater 112A and/or the heater element 218 to heat the processing liquid 122 if the temperature of the processing liquid 122 is below a predetermined temperature.

After the pipette 103 has been washed, the robot 160 may move the probe assembly 104 to another location. For example, the robot controller 162 may transmit instructions causing the robot 160 to move in the z-direction causing the dynamic coupler 102A to decouple the liquid delivery line 110A from the liquid line 106. The dynamic coupler 102A may prevent liquids from flowing when the liquid line 106 is decoupled from the dynamic coupler 102A. For example, the presence of the liquid line 106 in the dynamic coupler 102A may activate a valve (not shown) that enables liquid to flow through the dynamic coupler 102A. When the liquid line 106 is removed from the liquid delivery line 110A, the valve may prevent liquid from flowing through the dynamic coupler 102A. Thus, the processing liquid 122 is prevented from seeping from the dynamic coupler 102A and into the housing 134. Processing liquid may remain in the liquid line 214 or in other reservoirs after the probe assembly 104 has been decoupled from the dynamic coupler 102A.

First end 226 of the liquid line 106 may have a similar valve (not shown) as the above-described valve in the dynamic coupler 102A that prevents liquid flow unless the liquid line 106 is received in the dynamic coupler 102A. Such a valve in the first end 226 prevents liquids within the liquid line 106 and/or the liquid line 214 from seeping out of the pipette 103 or the liquid line 106 when the liquid line 106 is decoupled from the dynamic coupler 102A. Such seepage may cause air to enter the path of the processing liquid, which may impede the operation and/or performance of the probe assembly 104.

The end 226 may be tapered so as to be received in a similar taper in the second portion 204B of the dynamic coupler 102A. The taper may provide alignment of the probe assembly 104 to a specific location relative to the wash station 139 as the robot 160 lowers the probe assembly 104 onto the second portion 204B of the dynamic coupler 102A.

Figures 2C, 2D:
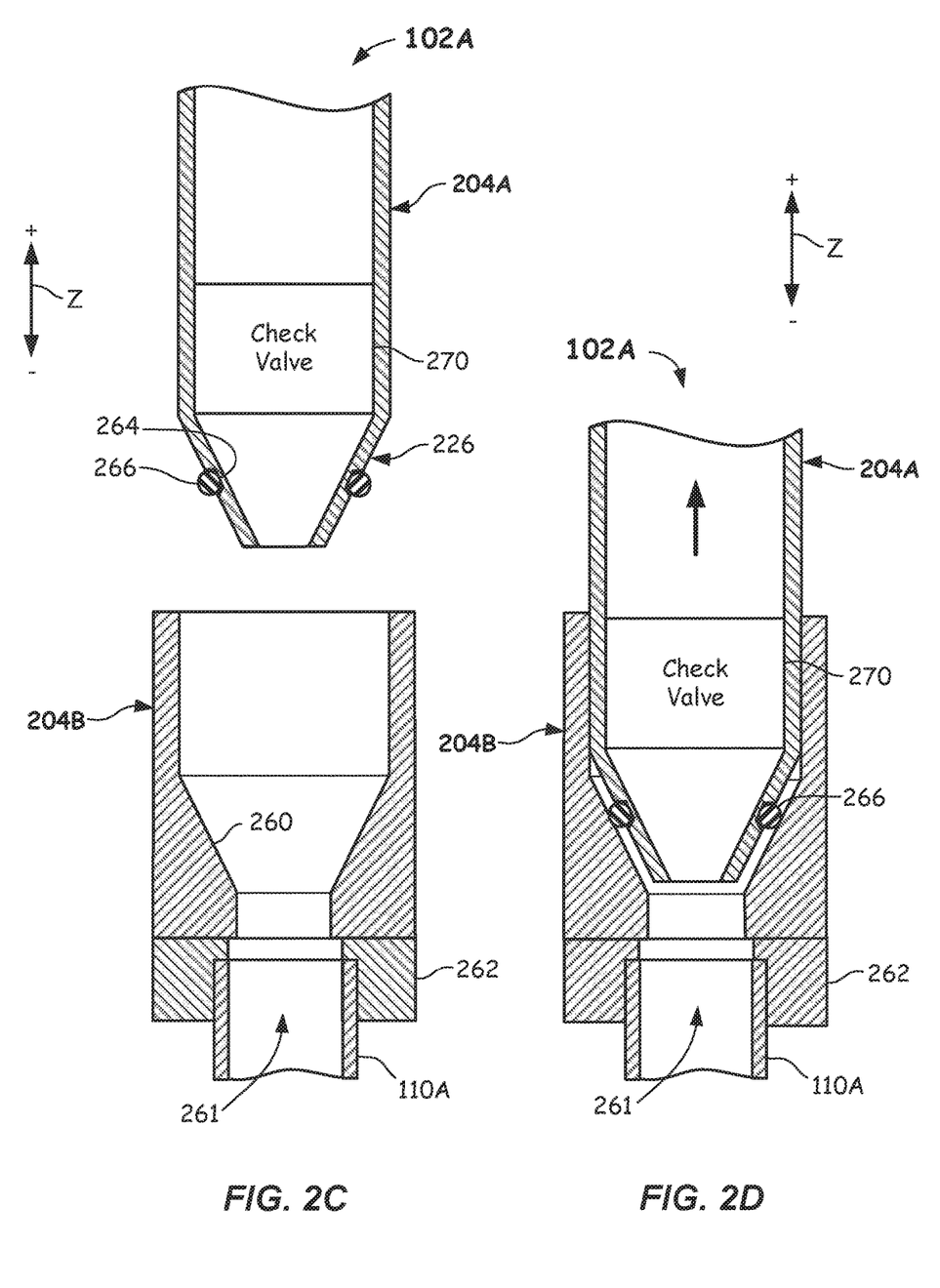
FIG. 2C illustrates a cross-sectional side view of a dynamic coupler in a decoupled state according to embodiments.
FIG. 2D illustrates a cross-sectional side view of the dynamic coupler of FIG. 2C in a coupled state according to embodiments.

Additional reference is made to FIGS. 2C and 2D, which show cross-sectional, enlarged side views of an embodiment of the dynamic coupler 102A. FIG. 2C shows the dynamic coupler 102A in a decoupled state and FIG. 2D shows the dynamic coupler 102A in a coupled state. The first portion 204A of the dynamic coupler 102A may be moveable by any suitable robot 160. The portion 204B of the dynamic coupler 102A may be fixed by any suitable means such that it is substantially immovable. When suitably coupled, a hermetic seal can be provided. In some embodiments, the hermetic seal may be provided by the interaction and engagement of any two sealing members. For example, the second portion 204B of the dynamic coupler 102A can include a tapered portion 260 that is sized and configured to receive and couple with the tapered end 226 of the first portion 204A. The second portion 204B may also include an opening or port 261 that is configured to be coupled to a liquid line, such as the liquid delivery line 110A, by way of a connection device 262, or liquid delivery line 110B by way of connection to dynamic coupler 102B.

The end 226 may include a recess 264 having a sealing member 266 received therein. In some embodiments, the sealing member 266 can be an O-ring formed of rubber or other suitable compliant material. When the dynamic coupler 102A is in a coupled state, such as depicted in FIG. 2D, the sealing member 266 may contact and seal to the tapered portion 260 to prevent liquid from leaking out from between the first portion 204A and the second portion 204B. In other embodiments, the tapered portion 260 may be made of or include a sealing material, such as an elastomer, such as rubber, thermoplastic elastomer (TPE), silicone, and the like. When the end 226 contacts the tapered portion 260, the end 226 and the tapered portion 260 form a hermetic seal.

The first portion 204A may include a check valve 270 that prevents liquid from leaking out the first portion 204A from end 226. For example, the check valve 270 may prevent liquid from passing from the first portion 204A into the liquid delivery line 110A when the dynamic coupler 102A is in the coupled state. The check valve 270 may also prevent liquid from leaking out of the first portion 204A when the dynamic coupler 102A is in a decoupled state.

The first portion 204A and the second portion 204B may couple together by the robot 160 translating the probe assembly 104 in the negative (−) z-direction to where the end 226 is received in the second portion 204B. The robot 160 may exert a force in the negative z-direction that enables the sealing member 266 to seal against the tapered portion 260. In such a configuration, liquids are prevented from leaking from the dynamic coupler 102A. Decoupling may be achieved by the robot 160 translating the probe assembly 104 in the positive (+) z-direction so as to remove the first portion 204A from the second portion 204B. Any other suitable quick sealing and coupling/decoupling means may be employed to seal between the first portion 204A and the second portion 204B.

Other mechanisms may be used in the dynamic coupler 102A. For example, a mechanical latch may secure the first portion 204A to the second portion 204B when they are forced together. A device, such as an actuator or solenoid (not shown) may be activated to release the mechanical latch so as to release the first portion 204A from the second portion 204B.

With additional reference to FIG. 1, the pipette 103 may be used to aspirate and dispense a specimen 140, a reagent 144, and/or process liquid 122. For example, in a "chase method," the robot 160, based upon control signals generated by the robot controller 162, may position the pipette 103 into the specimen container 142 containing a volume of specimen 140. The pump 208 may then draw (aspirate) a volume of the specimen 140 into the interior of the pipette 103 via appropriate signals from the flow controller 164, for example. The robot 160 may then move the probe assembly 104 to a reaction vessel 170 and transfer (dispense) the specimen 140 into the reaction vessel 170 by the pipette 103.

During the act of dispensing, the process liquid 122 may be fluidly coupled to, and in thermal contact with, the specimen 140 contained in the probe assembly 104, specifically, in the pipette 103 and the liquid line 214. Operation of the pump 208 causes flow of the process liquid 122 in the liquid line 214 and, thus, flow of specimen 140 fluidly coupled thereto and possibly abutting therewith (or possibly separated by a small air bubble). This dispensing of specimen 140 may be chased by dispensing a volume of the process liquid 122 from the liquid line 214 and pipette 103 into the reaction vessel 170 (FIG. 1). Similarly, the pipette 103 (or a different pipette and metering apparatus utilizing the process liquid 122 as a liquid vehicle) may also aspirate and dispense reagent 144 from the reagent vessel 146 if needed for the testing operation, and dispense the reagent 144 into the reaction vessel 170. Other or different component liquids may be aspirated and dispensed to the reaction vessel 170 by the probe assembly 104.

Figure 3A:
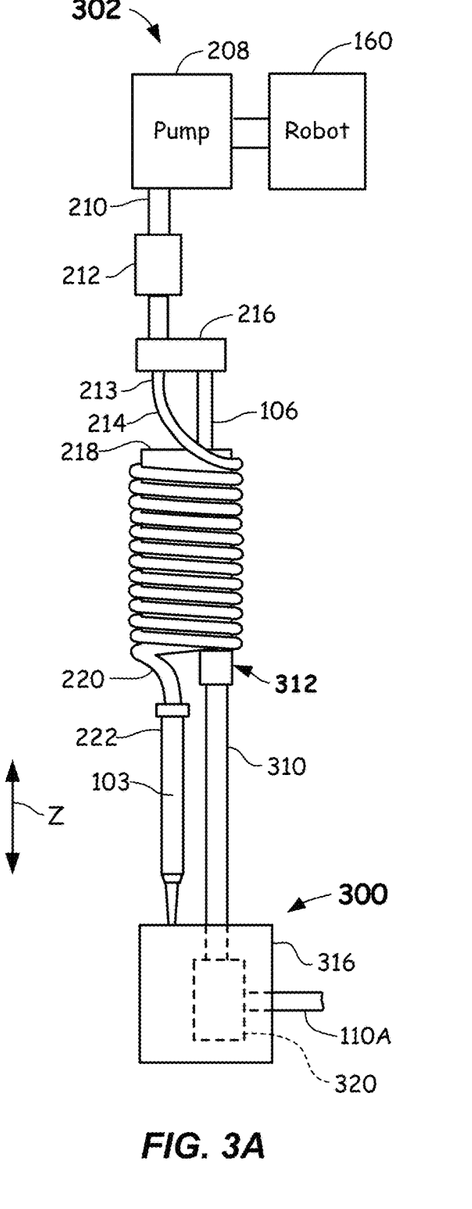
FIG. 3A illustrates a side view of a probe assembly coupled to a wash station in a first setting of a valve assembly, the wash station including a rigid liquid delivery line extending therefrom according to embodiments.
Figure 3B:
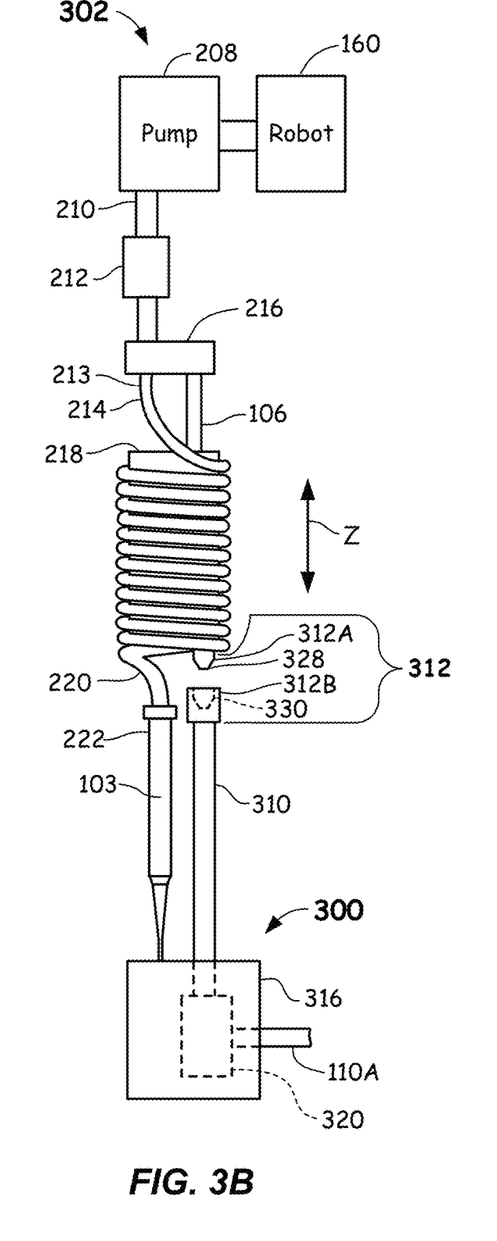
FIG. 3B illustrates a side view of the probe assembly of FIG. 3A decoupled from the wash station in a second setting of the valve assembly according to embodiments.

Reference is made to FIGS. 3A and 3B, which show a station, such as a wash station 300, and probe assembly 302. The wash station 300 may include a rigid liquid delivery line 310 coupled thereto. A rigid liquid delivery line may include a liquid line that may extend vertically and may support at least a portion of a dynamic coupler 312. The dynamic coupler 312 may be the same or similar to the dynamic coupler 102A of FIGS. 2C and 2D. Accordingly, the dynamic coupler 312 may include a first portion 312A and a second portion 312B. When the probe assembly 302 is translated into the wash station 300, the first portion 312A and the second portion 312B couple as described above. The wash station 300 may include a basin 316 from which the rigid liquid delivery line 310 extends. In some embodiments, the basin 316 and the rigid liquid delivery line 310 are integrally formed. In other embodiments, the rigid liquid delivery line 310 may extend from a station other than a wash station.

The basin 316 or other portion of the wash station 300 may include a heater 320 that heats process liquid received by the liquid delivery line 110A. The heater 320 may discharge the heated processing liquid to the rigid liquid delivery line 310. In other embodiments, the heater 320 may be located in other locations, such as in the rigid liquid delivery line 310 or external to the basin 316.

FIG. 3B shows the probe assembly 302 removed from the wash station 300. For example, the robot 160 may move the probe assembly 302 in the z-direction to decouple the first portion 312A of the dynamic coupler 312 from the second portion 312B. The probe assembly 302 may include a liquid line 106 including an end 328 with the first portion 312A attached thereto. The first portion 312A may be tapered and the second portion 312B of the dynamic coupler 312 may include a taper 330 that matches the taper of the first portion 312A. The first portion 312A and the taper 330 may be guides or alignment devices that align the probe assembly 302 to the wash station 300 as the probe assembly 302 is lowered onto the wash station 300. When the end 328 is received in the taper 330, the pipette 103 may be aligned within a specific location within the basin 316.

Figure 4A:
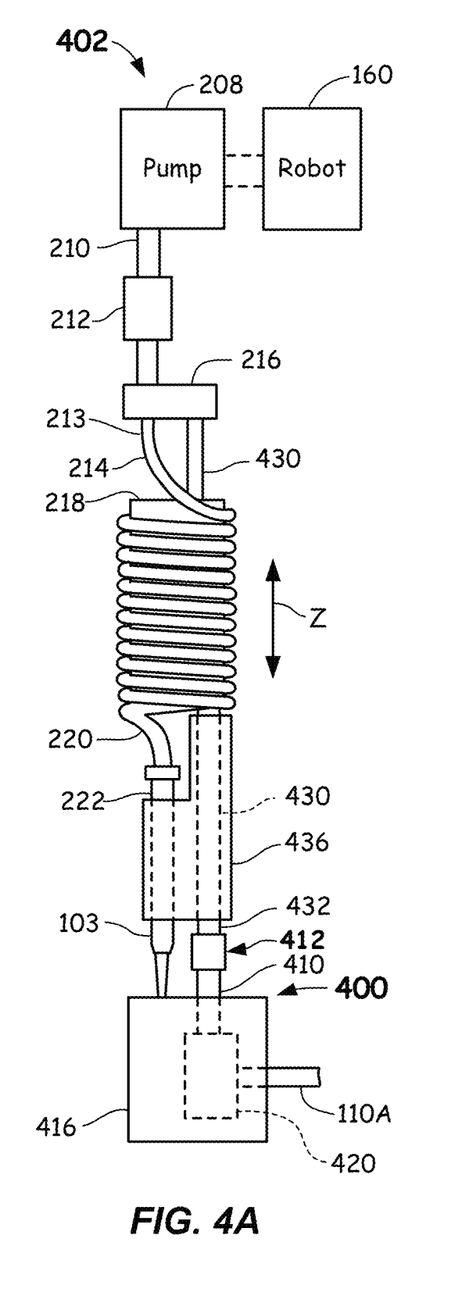
FIG. 4A illustrates a side view of a probe assembly coupled to a wash station in a first setting of a valve assembly, the probe assembly including a support member coupled between a pipette and a liquid delivery line according to embodiments.
Figure 4B:
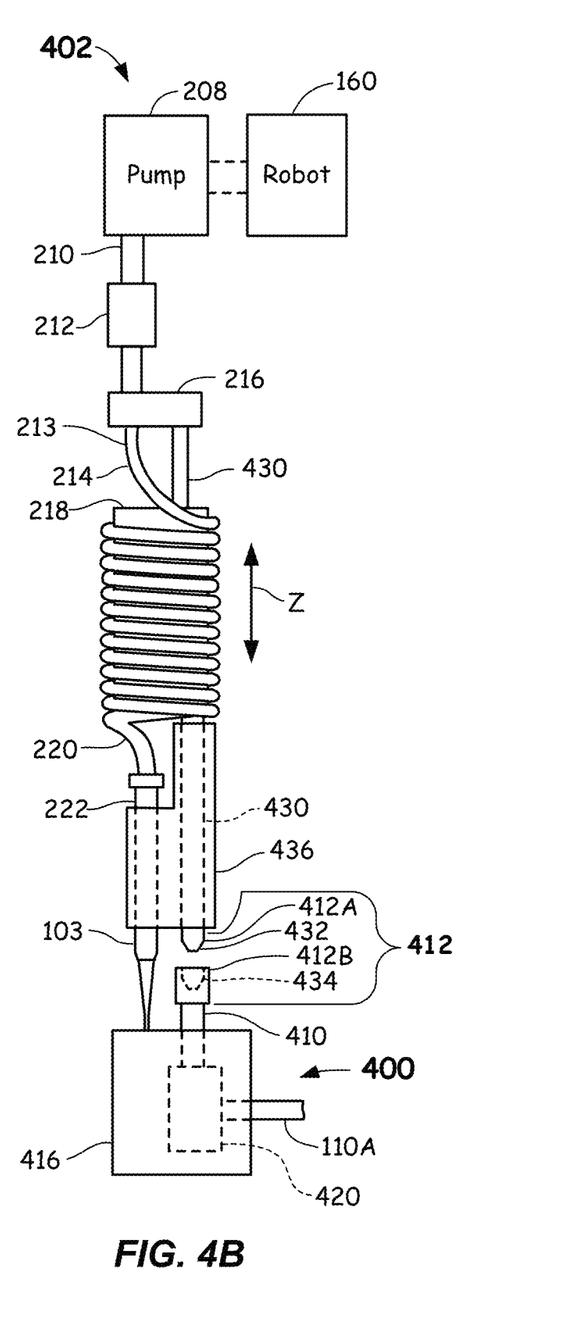
FIG. 4B illustrates a side view of the probe assembly of FIG. 4A decoupled from the wash station in a second setting of the valve assembly according to embodiments.

Reference is made to FIGS. 4A and 4B, which show a wash station 400 and a probe assembly 402. FIG. 4A shows a side view of the wash station 400 coupled to a probe assembly 402 and FIG. 4B shows the probe assembly 402 decoupled from the wash station 400. The wash station 400 may include a rigid liquid delivery line 410 coupled thereto. An end of the liquid delivery line 410 may be attached to a second portion 412B of a dynamic coupler 412. In other embodiments, the second portion 412B of the dynamic coupler 412 may be coupled directly to the wash station 400 without the use of the liquid delivery line 410. The dynamic coupler 412 may be similar or identical to the dynamic coupler 102A of FIGS. 2C and 2D. The wash station 400 may include a basin 416 to which the liquid delivery line 410 is coupled. In some embodiments, the basin 416 and the rigid liquid delivery line 410 are integrally formed.

The basin 416 or other portion of the wash station 400 may include a heater 420 that heats process liquid received from the liquid delivery line 110A. The heater 420 may discharge the heated processing liquid to the liquid delivery line 410. In other embodiments, the heater 420 may be located in other locations, such as in the liquid delivery line 410 or external to the basin 416.

The probe assembly 402 may include the pipette 103 and a liquid line 430 (i.e., a first liquid line) that receives the processing liquid into the probe assembly 402. The liquid line 430 may include an end 432 that includes the first portion 412A of the dynamic coupler 412. The liquid line 430 may be flexible or rigid. A support member 436 may be attached to pipette 103 and the liquid line 430 and may provide rigidity to the liquid line 430. The support member 436 may also align the first portion 412A and the second portion 412B of the dynamic coupler 412 during coupling of the probe assembly 402 to the wash station 400. The support member 436 may at least partially surround the liquid line 430, so that a liquid line 430 that is flexible may be pushed into the dynamic coupler 412. In some embodiments, the support member 436 extends proximate to or adjacent to the dynamic coupler 412 when the probe assembly 402 is coupled to the wash station 400.

FIG. 4B shows the probe assembly 402 removed or decoupled from the wash station 400. For example, the robot 160 may move the probe assembly 402 in the z-direction to decouple the first portion 412A of the dynamic coupler 412 from the second portion 412B. The end 432 including the first portion 412A may be tapered. The second portion 412B of the dynamic coupler may include a taper 434 that is similar to the end 432. The end 432 and the taper 434 may be guides or alignment devices that align the probe assembly 402 to the wash station 400 as the probe assembly 402 is lowered onto the wash station 400. When the end 432 is received in the taper 434, the pipette 103 may be aligned within a specific location within the basin 416.

Figure 5:
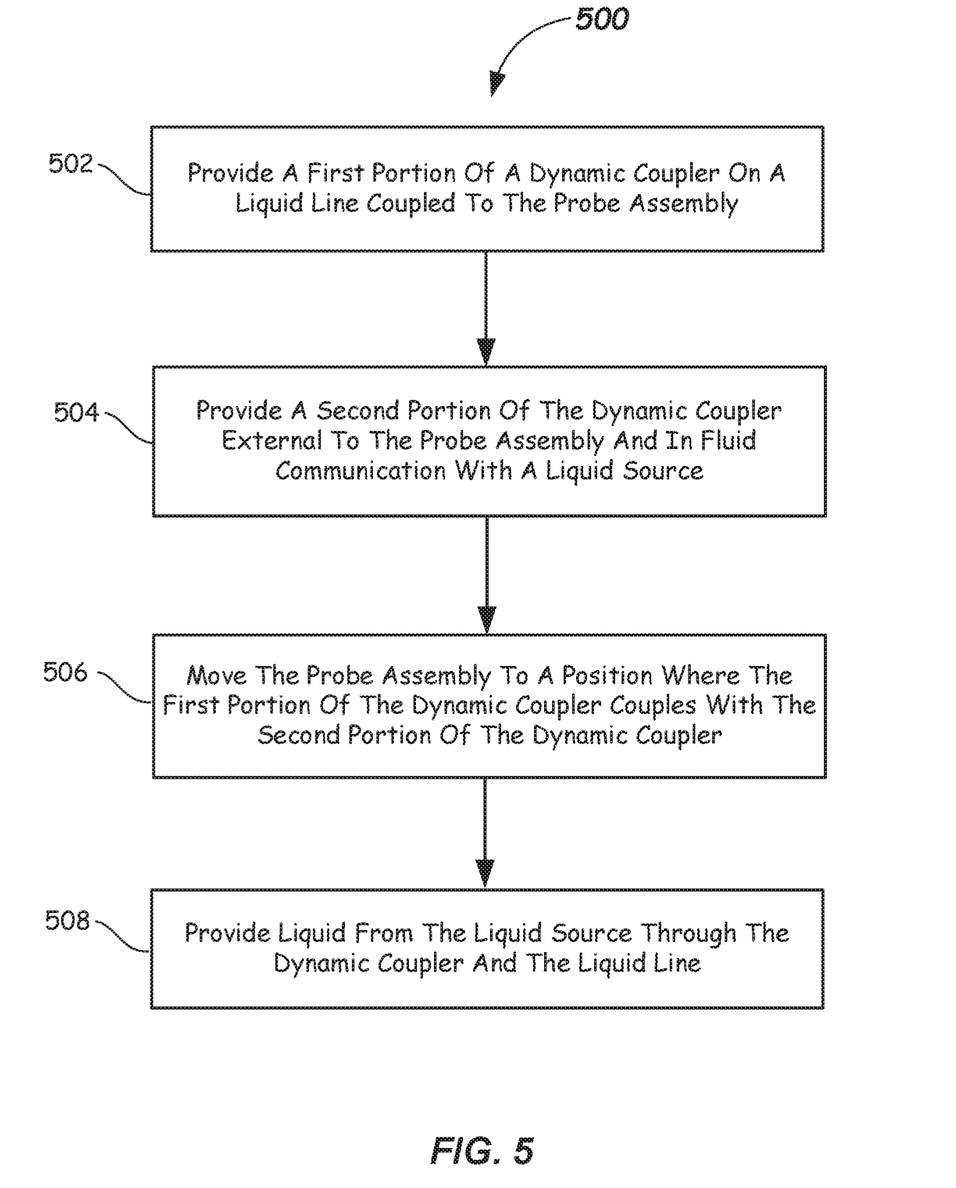
FIG. 5 illustrates a flowchart of a method of providing liquid to a probe assembly according to embodiments.

According to a method aspect, a method of providing liquid to a probe assembly according to one or more embodiments will now be described with reference to FIG. 5. The method 500 includes, in 502, providing a first portion (e.g., first portion 204A) of a dynamic coupler (e.g., dynamic coupler 102A) on a liquid line (e.g., liquid line 106) coupled to the probe assembly, and, in 504, providing a second portion (e.g., second portion 204B) of the dynamic coupler external to the probe assembly and in fluid communication with a liquid source (e.g., the tank 120). In 506, the method includes moving the probe assembly to a position where the first portion of the dynamic coupler couples with the second portion of the dynamic coupler, and, in 508 providing liquid (e.g., process liquid 122) from the liquid source through the dynamic coupler and the liquid line.

While the disclosure is susceptible to various modifications and alternative forms, specific assembly and apparatus embodiments and methods thereof have been shown by way of example in the drawings and are described in detail herein. It should be understood, however, that it is not intended to limit the disclosure to the particular assemblies, apparatus, or methods disclosed, but, to the contrary, the intention is to cover all modifications, equivalents, and alternatives falling within the scope of the claims.

What is claimed is:

1. A probe assembly configured to aspirate and deliver liquids, comprising:
    a pump;
    a first liquid line having a first liquid line end and a second liquid line end;
    a second liquid line;
    a valve assembly coupled to the pump, the second liquid line, and the second liquid line end, the valve assembly having first and second settings; and
    a pipette coupled via the second liquid line to the valve assembly and in fluid communication with the first liquid line via the first setting, the pipette configured to aspirate and dispense liquids when the valve assembly via the second setting ends fluid communication between the first liquid line and the pipette and couples the pump to the pipette; wherein:
    the first liquid line has a first portion of a dynamic coupler at the first liquid line end configured to be dynamically coupled to a second portion of a dynamic coupler.

2. The probe assembly of claim 1, further comprising the second portion of the dynamic coupler, wherein the first portion of the dynamic coupler has a first taper, the second portion of the dynamic coupler has a second taper, the first taper matches the second taper, and the second portion of the dynamic coupler is configured to be in fluid communication with a liquid source external to the probe assembly.

3. The probe assembly of claim 1, further comprising a robot coupled to the pump and configured to move the probe assembly to couple the first portion of the dynamic coupler with the second portion of a dynamic coupler.

4. The probe assembly of claim 1, wherein the first portion of the dynamic coupler decoupled from the second portion of the dynamic coupler prevents liquids from flowing through the first liquid line end.

5. The probe assembly of claim 1, further comprising a heater element configured to heat liquids in the first liquid line.

6. The probe assembly of claim 5, wherein the heater element is passive.

7. The probe assembly of claim 5, wherein the heater element is active.

8. The probe assembly of claim 5, wherein the first liquid line at least partially encircles the heater element.

9. The probe assembly of claim 1, further comprising a support member attached to at least a portion of an exterior of the first liquid line.

10. The probe assembly of claim 9, wherein the support member is further attached to at least a portion of the pipette.

11. The probe assembly of claim 1, wherein the first liquid line at the first liquid line end adjacent to the first portion of the dynamic coupler is coupled via the dynamic coupler to a rigid delivery line.

12. A testing apparatus, comprising:
    a probe assembly comprising:
        a liquid line having a liquid line end, the liquid line end having a first portion of a dynamic coupler configured to couple to a second portion of the dynamic coupler;
        a pipette fluidly coupled to the liquid line; and
        a pump fluidly coupled to the pipette;
    a liquid source external to the probe assembly; and
    a liquid delivery line external to the probe assembly and having a first end fluidly connected to the liquid source and a second end fluidly connected to the second portion of the dynamic coupler.

13. The testing apparatus of claim 12, wherein the second portion of the dynamic coupler is connected to a wash station.

14. The testing apparatus of claim 13, wherein the wash station includes a basin for receiving the pipette when the first portion of the dynamic coupler is coupled to the second portion of the dynamic coupler.

15. The testing apparatus of claim 14, further comprising a rigid fluid line between the basin and the second portion of the dynamic coupler.

16. The testing apparatus of claim 12, further comprising a heater in line with the liquid delivery line and configured to heat liquid received from the liquid source.

17. The testing apparatus of claim 12, wherein the probe assembly comprises a pump in fluid communication with the pipette and is configured to aspirate and dispense liquid by way of the pipette when the first portion of the dynamic coupler is decoupled from the second portion of the dynamic coupler.

18. The testing apparatus of claim 12, wherein the first portion of the dynamic coupler includes a first taper, wherein the second portion of the dynamic coupler includes a second taper, and wherein the first taper matches the second taper.

19. The testing apparatus of claim 12, wherein the probe assembly comprises a heater element configured to heat liquid in fluid communication with the pipette.

20. The testing apparatus of claim 19, wherein the heater element is passive.

21. The testing apparatus of claim 19, wherein the heater element is active.

22. The testing apparatus of claim 12, further comprising a robot configured to move the probe assembly throughout at least a portion of the testing apparatus.

* * * * *